May 17, 1960   J. MAZZARINS   2,936,841
TRACTOR SUSPENSION HAVING RESILIENTLY MOUNTED EQUALIZER BAR
Filed June 16, 1958   3 Sheets-Sheet 1
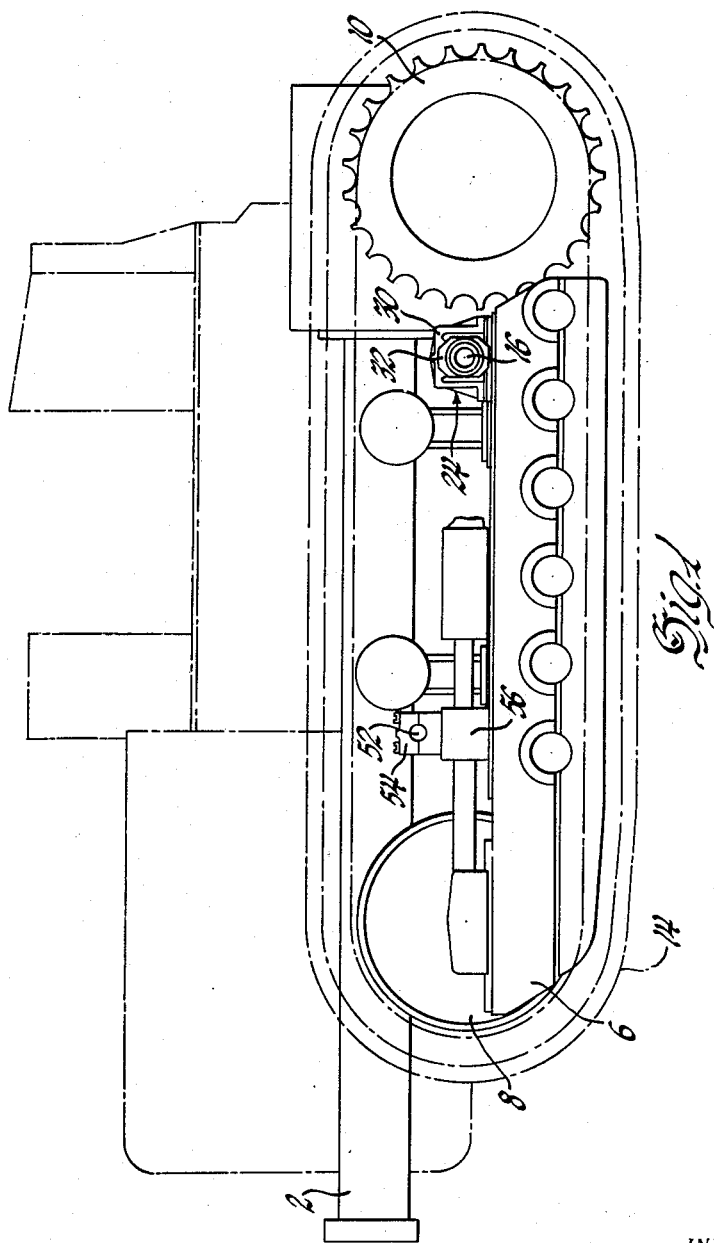
INVENTOR.
Janis Mazzarins
BY
R.F. Barnard
ATTORNEY

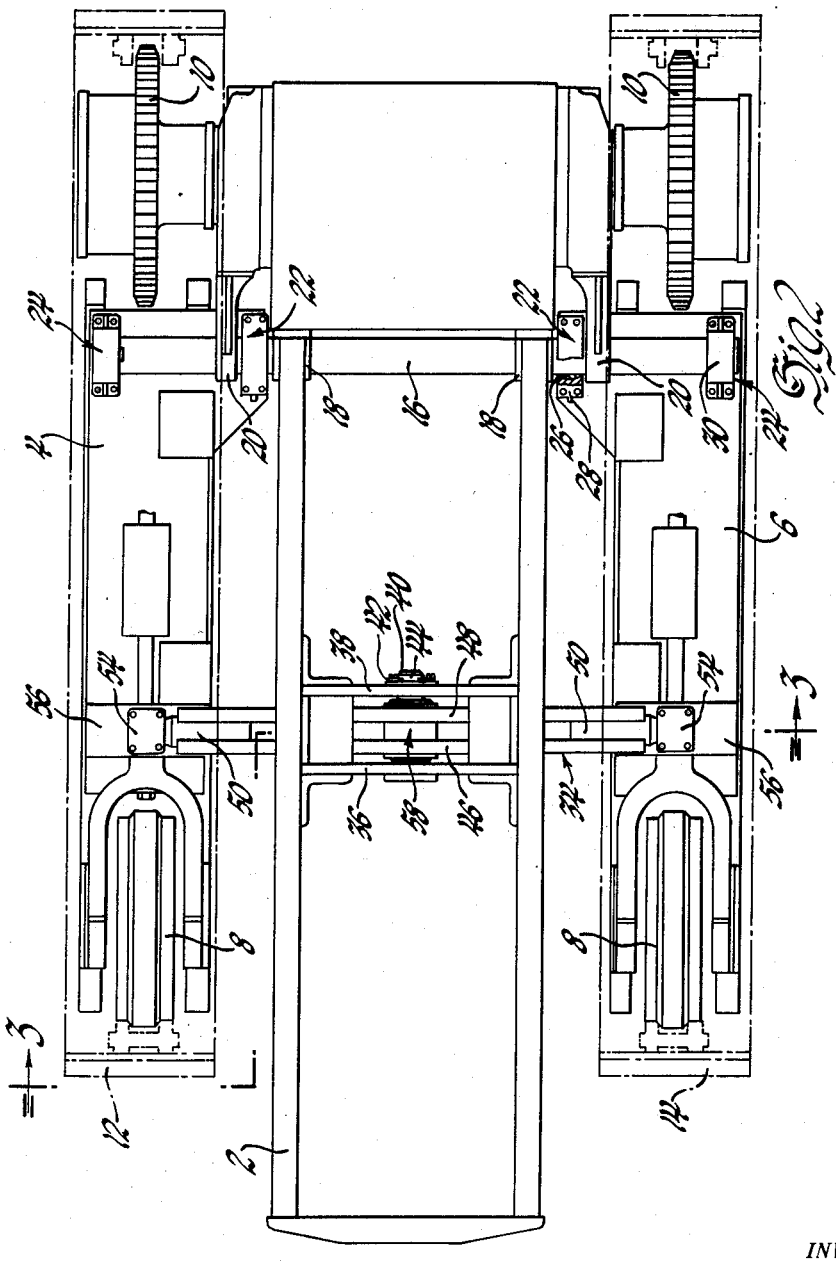

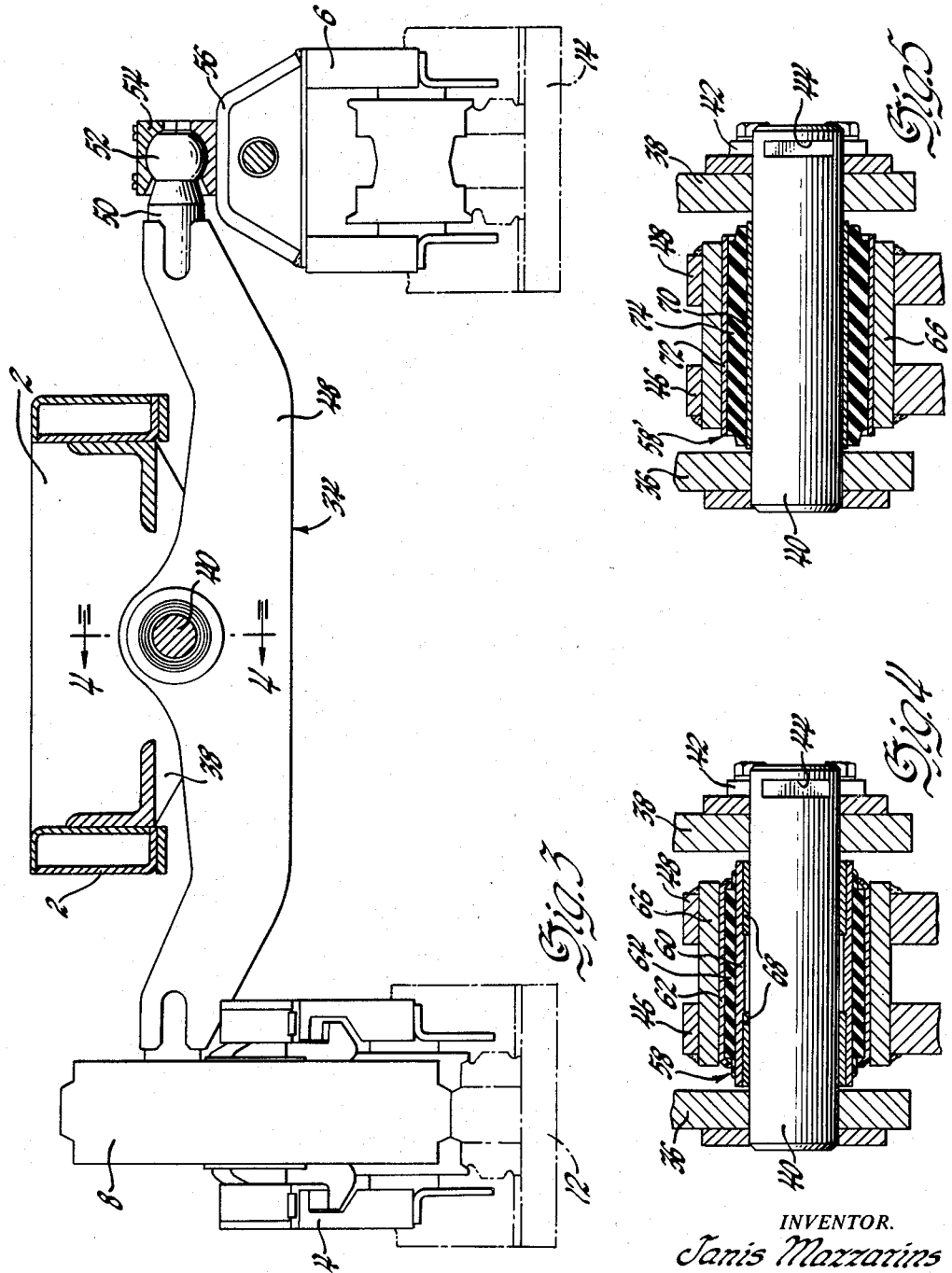

United States Patent Office 2,936,841
Patented May 17, 1960

2,936,841

TRACTOR SUSPENSION HAVING RESILIENTLY MOUNTED EQUALIZER BAR

Janis Mazzarins, Cleveland, Ohio, assignor to General Motors Corporation, Detroit, Mich., a corporation of Delaware Application June 16, 1958, Serial No. 742,401

8 Claims. (Cl. 180—9.54)

This invention relates to tracked vehicles and, in particular, to an equalizer bar suspension structure for crawler tractors.

Crawler tractors of the type herein contemplated typically include a main tractor frame or chassis adapted to be suspended on a pair of laterally spaced and aligned, longitudinally extending track frames and longitudinally spaced driving sprocket and idler wheels over which a ground-engaging endless track is adapted to be entrained. Suitable power plant and drive transmission means are provided on the main tractor chassis, and are drivingly connected to the aforementioned sprocket wheels to propel the vehicle.

The rearward end of the main tractor chassis is adapted to be supported on the respective track frames in such a manner as to permit the track frames to pivot relative to the tractor chassis and to each other as the vehicle negotiates irregular terrain, thereby avoiding loss of drive under normal circumstances. The respective rearward pivotal connections of the track frames to the tractor chassis may consist of means associated with laterally projecting axially aligned stub shafts to which the track drive sprockets are secured, a separate pivot shaft connection such as shown in the U.S. Patent No. 2,786,724, entitled "Track Suspension," issued on March 26, 1957, to Raymond Q. Armington et al., or any one of several other known pivotal connection means for this purpose. A third suspension point is provided at the mid-point of the tractor chassis forward of the rearward pivotal connections by means of a transversely extending rigid equalizer bar having its respective ends pivotally secured to a forward portion of the respective track frames. As a result, the main tractor chassis is suspended and supported on the track frames which are susceptible of rising and falling movement about their rearward pivotal connections to the tractor chassis for the reason aforementioned.

The equalizer bar connection to the tractor chassis is subjected to several types of loadings. In the first instance, this connection must bear a substantial portion of the static weight of the main tractor chassis. Additionally, it must withstand various dynamic and shock loadings as are occasioned by the rough work to which such a tractor is subjected and, moreover, by reason of the operation of various implements with which it may be equipped. For example, if such a tractor is equipped with a bulldozer blade adapted for pioneering work such as rooting trees or rough dozing work, it will be readily apparent that the forces imposed upon such a dozer blade will be transmitted to the tractor chassis thereby further loading its connection with the equalizer bar. Inasmuch as the track frames are pivotally connected at their rearward ends to the tractor chassis, it will also be apparent that the equalizer bar connection to the tractor chassis must accommodate relative swinging movement of the track frames relative to each other and to the tractor chassis. The respective track frames which are connected to the equalizer bar swing in arcuate paths causing a toe-in action occasioned by their rigid connection to the equalizer bar. Additionally, due to the fact that the track frames are pivoting about fixed connections to the tractor chassis, their respective points of connection to the ends of the equalizer bar move in arcs toward and away from the equalizer connection to the chassis as the track frames oscillate. Accordingly, the connection of the equalizer bar to the tractor chassis must further accommodate loads occasioned by the aforementioned toe-in action and relative movement of the ends of the equalizer bar relative to the connection thereof to the tractor chassis as the track frames rise and fall.

With respect to normal static and shock loads as aforementioned, it is advantageous to provide a resilient connection between the equalizer bar and the tractor chassis, but a connection which is sufficiently stiff so as to resist extreme movement of the chassis relative to the track frames such as might result from forces imposed on the chassis by an implement doing rough digging or pioneering work. On the other hand, it is desirable that such a resilient connection effectively accommodate relative tractor frame oscillation resulting in the aforementioned toe-in action and relative movement of the ends of the equalizer bar relative to the connection of the latter to the chassis as the track frames rise and fall. Furthermore, it is desirable that the equalizer bar not be overstressed by reason of the forces imposed upon it by the swingable track frames.

It is, therefore, a principal object and feature of this invention to provide an equalizer bar construction for use with tracked vehicles including a resilient connection between the bar and vehicle which provides a yieldable resilient suspension to resist the various loadings aforementioned while minimizing stresses imparted to the equalizer bar.

It is yet another object and feature of this invention to provide a resilient or yieldable connection between the mid-point of an equalizer bar and a tractor chassis, and which connection includes a yieldable bushing assembly which will effectively inherently absorb normal loadings of the type aforementioned, but which is sufficiently stiff so as to prevent undue relative movement between the main tractor chassis and the associated track frames during heavy pioneering work.

It is yet another object and feature of this invention to provide a resilient bushing assembly of the type aforementioned which includes outer and inner axially aligned cylindrical bushings having a resilient material bonded therebetween, the respective bushings being operatively connected, respectively, to the equalizer bar and tractor chassis whereby the various loadings to which the bar is subjected will be effectively accommodated by the assembly.

It is yet a more specific object and feature of this invention, according to one embodiment thereof, to provide a resilient bushing assembly of the type aforementioned which includes inner and outer concentrically disposed cylindrical bushings having a resilient material bonded therebetween, and in which the outer bushing is rigidly secured to the mid-portion of the equalizer bar while the inner bushing is longitudinally and rotatably movably disposed about a longitudinally extending pin or shaft secured to the tractor chassis, whereby the bar is free to rotate and slide longitudinally upon the shaft as the track frames rise and fall and the resilient material effectively absorbs static and shock loads and loads imposed by canting of the axes of the respective bushings due to the toe-in action of the track frames.

According to another embodiment of this invention, it is another object and feature thereof to provide a resilient bushing assembly of the type aforementioned in which the inner bushing assembly is rigidly secured to the shaft supported on the tractor chassis whereby the resilient material absorbs not only vertical and shock loads and loads due to toe-in of the track frames, but also loads imposed by the rotational and longitudinal shifting movement of the equalizer bar relative to the shaft as the track frames rise and fall.

These and other objects, features and advantages of this invention will become more apparent hereinafter as the description of the invention proceeds, and in which reference is made to the following drawings in which:

Figure 1 is a side elevational view of a crawler tractor embodying the invention;

Figure 2 is a plan view of the crawler tractor structure, certain parts being broken away and shown in phantom to more clearly illustrate the invention;

Figure 3 is a front elevational view, partly in section, looking in the direction of the arrows 3—3 of Fig. 2, showing the form and arrangement of the equalizer bar;

Figure 4 is a fragmentary sectional view taken on line 4—4 of Fig. 3 showing one form of the resilient bushing assembly of this invention; and Figure 5 is a view corresponding to Fig. 4, but showing another form of the resilient bushing assembly of this invention.

Referring now to the drawings and particularly Figs. 1 and 2, a crawler tractor is illustrated comprising a main tractor body or chassis 2, and a pair of laterally spaced and aligned, longitudinally extending track frame assemblies 4 and 6. An idler wheel 8 is mounted at the forward end of each track frame assembly, while driving sprocket wheels 10 are mounted on the tractor chassis as part of the tractor final drive and extend into substantial alignment with the respective track frame assemblies. The ground-engaging endless tracks 12 and 14 are entrained about the idler and sprocket wheels. The sprocket wheels are adapted to be driven to propel the vehicle by means of a suitable power plant and transmission means operatively secured thereto in any of the manners well known in this art. Further detailed description of the track frame assemblies 4 and 6 is considered to be unnecessary inasmuch as their precise constructions in and of themselves form no part of this invention. However, for a more detailed description of a similar form of track frame construction, reference may be made to U.S. Patent No. 2,823,079, entitled "Track Roller Assembly," issued February 11, 1958, to R. C. Williams.

Although the respective track frame assemblies 4 and 6 may be operatively pivotally connected to the tractor chassis 2 for relative oscillation therebetween by any suitable means, including the laterally projecting axially aligned stub shafts (not shown) drivingly engaging the respective driving sprockets 10, there is shown for the purpose of illustration a type of pivotal connection corresponding to that shown in the aforementioned U.S. patent to Armington et al. However, as the description of the invention proceeds, it will be readily apparent that many forms of pivotal connections may be utilized to connect the respective track frame assemblies to the tractor chassis to permit rise and fall of the track frames relative to each other and to the tractor chassis.

The track frame assemblies 4 and 6 are mounted for swinging movement on the opposite ends of a transversely extending pivot shaft 16, the mid-portion of which is rigidly secured to the tractor frame or chassis 2 by means of laterally spaced clamp structures 18 and 20. As will be seen in Fig. 2, the pivot shaft 16 is aligned in parallel relation with the axis of rotation of the track driving sprockets 10. Accordingly, the track frame assemblies 4 and 6 and their associated idler wheels 8 swing about the pivot shaft 16 as the vehicle progresses over irregular terrain.

Inasmuch as the equalizer bar structure to be described hereinafter induces a degree of toe-in of the track assemblies when the latter either rise or fall, it will be apparent that a certain degree of stress will be imposed on the transverse pivot shaft 16 if the connection thereto of the respective track assemblies does not include appropriate means to accommodate such movement. In order to eliminate any such stresses, each of the track assemblies 4 and 6 are pivotally secured to the shaft 16 by means of spaced bearing structures 22 and 24. Each of the bearing structures 22 includes a bearing element 26 secured to shaft 16 and having a spherical outer surface which is retained within a similarly shaped cage 28 rigidly secured to the track frame. Because of this connection, the respective bearing structures 22 function to a limited extent as a ball joint, and permit limited vertical and horizontal swinging movement of the respective track frames without imparting severe stresses on the shaft 16. Bearing structures 24, in turn, are located adjacent the respective outer extremities of shaft 16 and include a sliding bearing cage 30 secured to the track frames and capable of limited longitudinal sliding movement on a block 32 on shaft 16. Consequently, any arcuate swinging movement of the track frames induced by the stabilizer bar to be described is about a point located at the center of the bearing structure 22 which causes sliding bearing cage 30 to move on block 32 a sufficient distance to compensate for this arcuate movement.

In order to support the forward end of the tractor frame and body structure 2 in a normal horizontal position as well as to prevent uncontrolled angular spreading and converging of the forwardly extending track assemblies 4 and 6, there is provided a transversely extending rigid equalizer bar 34 adapted to have its mid-portion connected to longitudinally spaced plates 36 and 38 depending from the main frame 2 and through which there extends a longitudinal shaft 40. The shaft 40 is fixed against rotation and secured to the plates by a locking plate 42 secured to plate 38 and cooperating with keyways 44 on the periphery of the shaft (see Figs. 4 and 5). Naturally, the other end of shaft 40 may be similarly connected non-rotatably to plate 36. The equalizer bar includes longitudinally spaced members 46 and 48 to either end of which there are secured large laterally projecting shafts 50 terminating in a spherical ball member 52 seated within a similarly shaped socket 54 secured to an upstanding bracket 56 carried by the upper walls of the track frame assemblies 4 and 6. A resilient bushing assembly indicated generally at 58 forms an operative connection between the shaft 40 and the mid-portion of the equalizer bar 34.

One form of the resilient bushing assembly 58 is shown in Fig. 4 and includes radially spaced inner and outer coaxial sleeves 60 and 62, respectively, between which there is secured as by bonding a suitable resilient material such as a mass of rubber 64. The outer sleeve 62 is rigidly secured to the inner surface of a longitudinally extending cylindrical bushing 66 firmly secured between the members 46 and 48 of the equalizer bar at the midpoint of the latter. Sleeve-like bearings 68 are press-fitted or otherwise secured within the inner sleeve 60 and frictionally but loosely engage the shaft 40 for rotational and axial movement relative thereto. It will be noted from Fig. 4 that the extreme axial ends of the bushing assembly 58 are slightly spaced from the adjacent walls of the depending plates 36 and 38 secured to the tractor chassis.

Another form of the bushing assembly 58' is shown in Fig. 5 and includes inner and outer radially spaced coaxial sleeves 70 and 72 between which there is suitably secured as by bonding a resilient material such as a rubber mass 74. The outer sleeve 72 is again firmly secured as by press-fitting to the inner surface of the cylindrical bushing or housing 66 carried by the equalizer bar, but in this embodiment the inner sleeve 70 is likewise fixedly secured to the shaft 40 to resist relative rotational and axial movement between the bearing assembly 58' and the shaft 40.

The bearing assemblies of Figs. 4 and 5 have the common function of providing a yieldable means for cushioning static and shock loads imposed upon the vehicle. However, these assemblies are sufficiently stiff so as to effectively resist extreme relative movement between the tractor chassis and track roller frames by reason of thrust imposed upon the chassis by an implement secured thereto which is engaged in rough work. On the other hand, the respective bearing assemblies shown differ from each other in the manner in which they accommodate the rise and fall of the track frames 4 and 6 while preventing the equalizer bar 34 and associated parts from being over-stressed.

Referring first to the embodiment of Fig. 4, it will be remembered that the sockets 54 travel in arcuate paths as the respective track frames rise and fall. The vertical component of this movement results in pivoting movement of the equalizer bar in a plane substantially transverse to the axis of the shaft 40, the sleeve-like bearings 68 accommodating this rotational movement. With respect to the horizontal component of track frame movement or its toe-in occasioned by the connection of the equalizer bar 34, the bearing assembly 58 is capable of limited sliding movment on the axis of the shaft 40 between the plates 36 and 38 to accommodate this component of motion. Consequently, the equalizer bar is not over-stressed.

Referring now to the embodiment of Fig. 5 it will become apparent that the equalizer bar must still rotate substantially about the axis of the shaft 40, and the ball members 52 in sockets 54 must be capable of limited rearward shifting movement as the track frames rise and fall. However, in this embodiment, the inner sleeve 70 is fixed with respect to the shaft 40. Consequently, as the equalizer bar rotates substantially about the axis of the shaft 40, a stress is imposed upon the rubber mass 74 while permitting equalizer bar movement without over-stressing the latter. Similarly, to accommodate the toe-in action of the track assemblies, the axis of the outer sleeve 72 will become canted with respect to the axis of the inner sleeve 70 and shaft 40 thereby stressing the rubber mass 74 which will absorb this movement. Therefore, the bearing assembly shown in Fig. 5 is similar to that of Fig. 4 in permitting arcuate movement of the spherical members 52 with the socket members 54 but by stressing of the rubber mass 74 as compared to relative rotational and axial movement of the bearing assembly 58 relative to the shaft 40 as shown in Fig. 4.

In addition to the considerations set forth above, the aforedescribed bushing assemblies are relatively long-lived although subjected to severe loadings. Additionally, practically no problem is presented with respect to snow, ice, mud and the like becoming frozen on or otherwise clogging the assemblies which would result in disabling them for the purpose intended.

Having disclosed for the purpose of illustration two forms of this invention, it is, of course, understood that this disclosure is in no way intended to limit the scope of the invention which is defined by the claims which follow.

I claim:

1. In a crawler tractor, the combination of a main tractor chassis, longitudinally extending track frames at either side of said chassis, pivotal connecting means between the rearward ends of said track frames and said chassis whereby said track frames may swing relative to said chassis and to each other, a longitudinally extending shaft connected to the mid-portion of said chassis forward of said pivotal connecting means, a transversely extending rigid equalizer bar having its mid-portion surrounding and radially spaced from said shaft, means pivotally connecting the respective ends of said equalizer bar to the track frames forwardly of their pivotal connections to said chassis, and a resilient bushing assembly between the mid-portion of said bar and said shaft, said assembly comprising inner and outer axially aligned cylindrical sleeves having a resilient material firmly bonded therebetween, said inner and outer sleeves being supported, respectively, on said shaft and bar mid-portion.

2. In a crawler tractor, the combination of a main tractor chassis, longitudinally extending track frames at either side of said chassis, pivotal connecting means between the rearward ends of said track frames and said chassis whereby said track frames may swing relative to said chassis and to each other, a pair of longitudinally spaced plates depending from said chassis forwardly of said pivotal connecting means, a shaft extending longitudinally between said plates and secured thereto, a transversely extending rigid equalizer bar having its mid-portion surrounding and radially spaced from said shaft, means universally connecting the respective ends of said equalizer bar to the track frames forwardly of their pivotal connections to said chassis, and a resilient bushing assembly between the mid-portion of said bar and said shaft, said assembly comprising inner and outer axially aligned cylindrical sleeves having a resilient material firmly bonded therebetween, said inner and outer sleeves being supported, respectively, on said shaft and bar mid-portion.

3. In a crawler tractor, the combination of a main tractor chassis, longitudinally extending track frames at either side of said chassis, pivotal connecting means between the rearward ends of said track frames and said chassis whereby said track frames may swing relative to said chassis and to each other, a longitudinally extending shaft connected to the mid-portion of said chassis forward of said pivotal connecting means, a transversely extending rigid equalizer bar having its mid-portion surrounding and radially spaced from said shaft, means pivotally connecting the respective ends of said equalizer bar to the track frames forwardly of their pivotal connections to said chassis, and a resilient bushing assembly between the mid-portion of said bar and said shaft, said assembly comprising inner and outer axially aligned cylindrical sleeves having a resilient material firmly bonded therebetween, said outer sleeve being fixedly secured to said bar mid-portion, and said inner sleeve being movably supported on said shaft.

4. In a crawler tractor, the combination of a main tractor chassis, longitudinally extending track frames at either side of said chassis, pivotal connecting means between the rearward ends of said track frames and said chassis whereby said track frames may swing relative to said chassis and to each other, a pair of longitudinally spaced plates depending from said chassis forwardly of said pivotal connecting means, a shaft extending longitudinally between said plates and secured thereto, a transversely extending rigid equalizer bar having its mid-portion surrounding and radially spaced from said shaft, means universally pivotally connecting the respective ends of said equalizer bar to the track frames forwardly of their pivotal connections to said chassis, and a resilient bushing assembly between the mid-portion of said bar and said shaft, said assembly comprising inner and outer axially aligned cylindrical sleeves having a resilient material firmly bonded therebetween, said outer sleeve being fixedly secured to said bar mid-portion, said inner sleeve surrounding and slidably engaging said shaft.

5. In a crawler tractor, the combination of a main tractor chassis, and laterally spaced longitudinally extending track frames including means pivotally connecting a rearward portion of said track frames to said chassis for swinging movement relative thereto and to each other, a transversely extending rigid equalizer bar having bearing members at its respective ends including a spherical bearing surface seated for pivoting movement in corresponding sockets rigidly secured to said track frames forwardly of said pivotal connecting means between said frames and chassis, a resilient bushing assembly at the mid-portion of said bar, said assembly comprising an outer longitudinally extending cylindrical bushing secured to said bar mid-portion and an inner longitudinally extending cylindrical bushing bonded thereto by a resilient material, a shaft extending through and movable relative to said inner bushing, and longitudinally spaced support means depending from said chassis and spaced from the ends of said assembly, the ends of said shaft being fixed in said support means.

6. In a crawler tractor, the combination of a main tractor chassis, longitudinally extending track frames at either side of said chassis, pivotal connecting means between the rearward ends of said track frames and said chassis whereby said track frames may swing relative to said chassis and to each other, a longitudinally extending shaft connected to the mid-portion of said chassis forward of said pivotal connecting means, a transversely extending rigid equalizer bar having its mid-portion surrounding and radially spaced from said shaft, means universally pivotally connecting the respective ends of said equalizer bar to the track frames forwardly of their pivotal connections to said chassis, and a resilient bushing assembly between the mid-portion of said bar and said shaft, said assembly comprising inner and outer axially aligned cylindrical sleeves having a resilient material firmly bonded therebetween, said outer sleeve being secured to said bar mid-portion, said inner sleeve surrounding and being secured to said shaft.

7. In a crawler tractor, the combination of a main tractor chassis, and laterally spaced longitudinally extending track frames including means pivotally connecting a rearward portion of said track frames to said chassis for swinging movement relative thereto and to each other, a transversely extending rigid equalizer bar having bearing members at its respective ends including a spherical bearing surface seated for pivoting movement in corresponding sockets rigidly secured to said track frames forwardly of said pivotal connecting means between said frames and chassis, a resilient bushing assembly at the mid-portion of said bar, said assembly comprising an outer longitudinally extending cylindrical bushing secured to said bar mid-portion and an inner longitudinally extending cylindrical bushing bonded thereto by a resilient material, a shaft extending through and secured to said inner bushing, and longitudinally spaced support means depending from said chassis, the ends of said shaft being fixed in said support means.

8. In a crawler tractor, the combination of a main chassis, track frames at either side of said main frame, a transversely extending pivot shaft rigidly connected to said main frame, laterally spaced bearing means connecting one end of each of said track frames to said shaft for swinging movement relative to said main frame and each other, a transversely extending rigid equalizer bar pivotally connected at its mid-portion on a longitudinal axis at the forward end of said main frame, means connecting one end of said bar to one of said tracks and the other end of said bar to the other of said tracks to control the spacing of said tracks during rise and fall thereof, said equalizer bar connection to said main frame comprising a resilient bushing assembly, said assembly having inner and outer axially aligned cylindrical bushings and a resilient material bonded therebetween, said outer bushing being rigidly secured to said bar mid-portion, a longitudinally extending shaft projecting through and secured to said inner bushing, and support means depending from said chassis in which the ends of said shaft are supported.

References Cited in the file of this patent
UNITED STATES PATENTS

| | | |
|---|---|---|
| 1,890,975 | Erdahl | Dec. 13, 1932 |
| 2,237,575 | Quartullo | Apr. 8, 1941 |
| 2,705,175 | McIntyre | Mar. 29, 1955 |
| 2,786,724 | Armington | Mar. 26, 1957 |